United States Patent [19]
Elder

[11] Patent Number: 5,853,098
[45] Date of Patent: Dec. 29, 1998

[54] REPOSITIONING BACKPLATE FOR AN ELECTRICAL OUTLET BOX

[76] Inventor: Rodger D. Elder, 3680 E. 63rd St., Cleveland, Ohio 44105

[21] Appl. No.: 829,504

[22] Filed: Mar. 28, 1997

[51] Int. Cl.[6] ....................................................... H02G 3/12
[52] U.S. Cl. ............................. 220/3.7; 220/3.94; 220/3.3
[58] Field of Search ............................... 220/3.2, 3.3, 3.7, 220/3.9, 3.92, 3.94

[56] References Cited

U.S. PATENT DOCUMENTS

| | | | |
|---|---|---|---|
| 928,251 | 7/1909 | Dorff | 220/3.94 |
| 1,201,003 | 10/1916 | Van Duzer | 220/3.94 |
| 1,483,453 | 2/1924 | Knoderer | 220/3.94 |
| 1,534,723 | 4/1925 | Lewis | 220/3.94 |
| 1,734,543 | 11/1929 | Thomas, Jr. | 220/3.94 |
| 1,774,935 | 9/1930 | Mangin | 220/3.92 |
| 3,676,571 | 7/1972 | Rubinstein | 220/3.92 |
| 4,071,159 | 1/1978 | Robinson et al. . | |
| 4,199,072 | 4/1980 | Jacks | 220/3.8 |
| 4,295,575 | 10/1981 | Flachbarth | 220/3.94 |
| 4,389,535 | 6/1983 | Slater et al. . | |
| 4,821,904 | 4/1989 | Bhargava et al. . | |

*Primary Examiner*—Stephen J. Castellano
*Attorney, Agent, or Firm*—Joseph H. Taddeo

[57] ABSTRACT

An improved knockdown electrical outlet box with a new and useful, removable rear cable entry port that facilitates the admission and retention of electrical cables. Removable side wall members allow a plurality of boxes to be ganged together for additional electrical outlets or switches. When used gangably, removable breakout strips that are partially indented enlarge the rear access area.

12 Claims, 3 Drawing Sheets

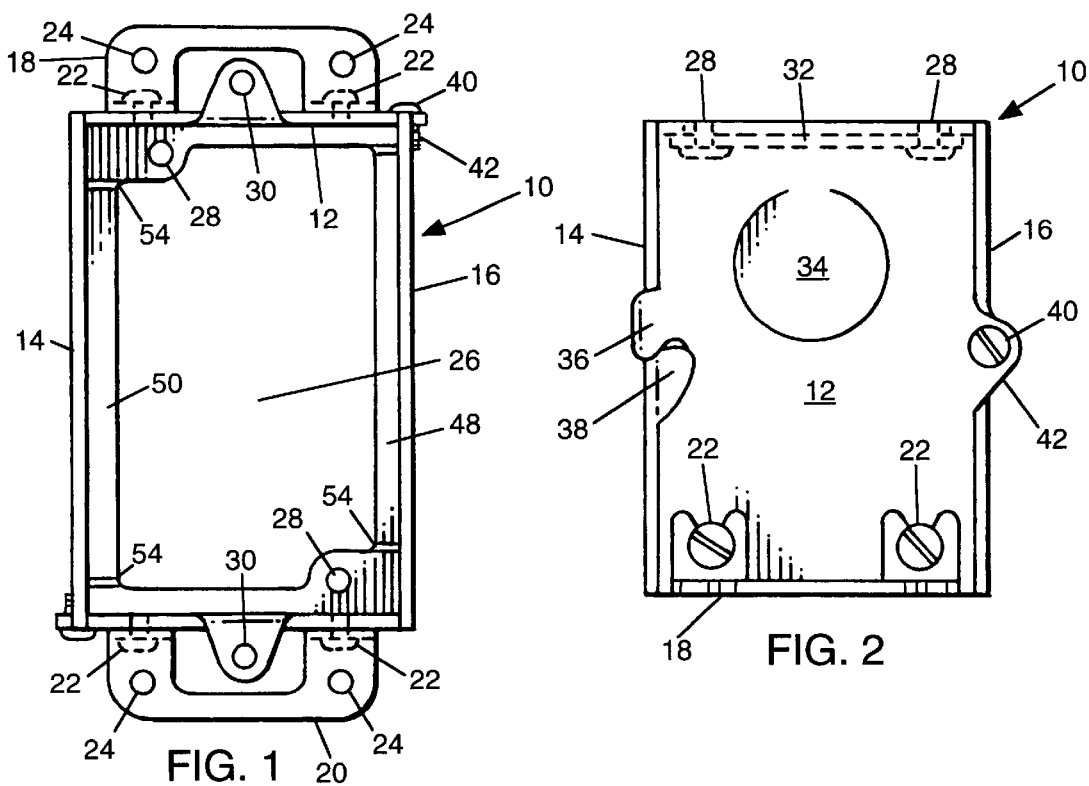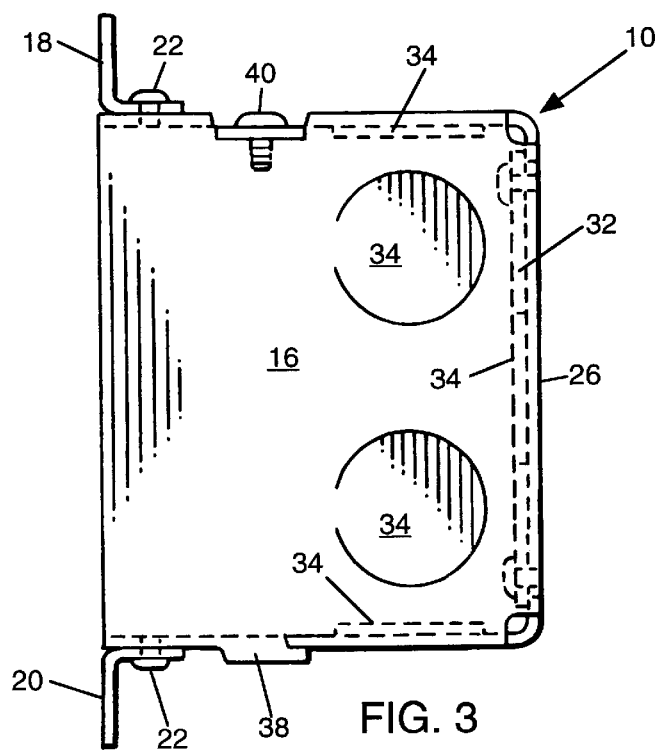

REPOSITIONING BACKPLATE FOR AN ELECTRICAL OUTLET BOX

FIELD OF INVENTION

The present invention relates to electrical outlet boxes, and more particularly to new and useful improvements to the rear cable entry port to facilitate the admission and retention of electrical cables into an electrical outlet box. Removable side wall members of a knockdown of an electrical outlet box allow a plurality of boxes to be gangable. When used gangably, removable breakout strips that are partially indented enlarge the rear access area.

BACKGROUND OF THE INVENTION

A typical electrical outlet box is generally constructed in a boxlike structure where the front of the box is open to the user. The top, back and bottom is generally formed from a continuous metal stamping. Removable side wall members complete the boxlike configuration.

Single cable entry ports, typically referred to as "knockouts," are found on the top, rear and bottom surfaces. Multiple cable entry ports are generally found in each side wall member. These knockouts permit one or more power cables access to the interior of the box. Unused knockouts remain essentially closed by the partial piercing made during the manufacturing process of these boxes. Keeping these unused entry ports closed, prevents debris from entering the interior of the box and also minimizes the spread of fire, in the event of a malfunction in the apparatus housed in the box.

Electrical outlet boxes are used to house electrical connections that are made between the conductor wires of an electrical power cable and an electrical fixture, such as an electrical power receptacle or an electrical switch. A power cable may be of the type as a plastic sheathed conductor cable, more commonly referred to as "ROMEX" or a helical wrapped metallic sheathed cable, known in the art as "BX."

U.S. Pat. No. 4,821,904, granted Apr. 18, 1989, to N. N. Bhargava, et al, discloses a molded plastic electrical outlet box having improvements relating to a plurality of webs for attaching a cable entry aperture knockout panel to a box wall structure.

U.S. Pat. No. 4,389,535, granted Jun. 21, 1983 to T. S. Slater et al, discloses improvements to a molded plastic electrical outlet box that has an improved knockout structure with novel cable retention.

U.S. Pat. No. 4,071,159, granted Jan. 31, 1978, to R. L. Robinson et al, teaches of an injection molded synthetic resin electrical junction or switch box that has easily removed knockouts from inside the box. A conventional cover plate or switch plate is rapidly secured using conventional machine screws.

Several of the above referenced prior art disclose electrical outlet wall boxes that are fashioned in a one piece plastic construction. Many of those disclosed in the prior art, have integral cable entry ports that provide a flexible closure about the cable and are wedged to prevent the accidental withdrawal of the inserted cable. Some are provided with rectangular slots that are suitable for gripping Romex cables; others have knockouts suitably designed to accept round shaped cables.

These present designs find particular application in new construction, where the electrical installer can route the power cables to enter through the top or bottom ports of the electrical outlet box. In new construction, the side and rear cable entry ports are infrequently used.

However, when installing electrical outlet boxes in existing homes and offices, the power cables are routed between the walls and directed to a rectangular opening that conforms to the size of the outlet box. In older construction, the walls are constructed to allow for a 3⅝ inch spacing between the finished wall boards. Typically, the depth of an outlet box is 2½ inches. When used with a wall board of ½ inch thickness, the distance between the rear of the outlet box and the opposing wall board is approximately 1½ inches. Hence, one cannot install the power cables in either the top or bottom ports, or neither side ports without having to undesirably enlarge the rectangular opening to receive the partially assembled outlet box.

What is needed is a knockdown gangable electrical outlet box that not only has removable side members but also a removable interior rear member, that has a cable entry port to allow access to the electrical cable after the box is mounted into a rectangular hole cut in the wallboard.

SUMMARY OF THE INVENTION

The present invention finds particular application as a knockdown electrical outlet box that is designed for use in older homes and buildings, especially where there is limited access to the interior power cables. It is designed to fit conformably into a rectangular cut hole in the wallboard. Power connections to the electrical outlets or switches are made after the electrical outlet box is inserted into its fitted hole.

In the preferred embodiment, the metal electrical outlet box is constructed in a U-shaped stamped metal form, which constitutes the top, rear and bottom of the box. The side members, which are designed identical to each other, are engaged in an interlocking manner and each side retained by a single machine screw.

The rear member is retained to the rear wall by two machine screws. A knockout is provided in the rear member that is intended to accept a strain relief cable bushing with clamp as the primary cable entry port.

Attached to the top and bottom of the box, are two identical mounting brackets that prevent the box from being pushed into the wallboard cavity. Two holes are provided in each bracket to secure the outlet box when the wallboard is wooden paneling. When the wallboard is a plastered wall or a plaster drywall, thin metallic securing devices that have ears that bend into the outlet box opening can be used.

The outlet box is designed to be gangable, where two boxes are joined together thereby forming a cavity that will accept additional outlets or switches.

These boxes are physically joined together by first removing the side members, one from each box. Removable breakout strips that are partially indented are provided to enlarge the rear access area opening. At the bottom of the box are two interlocking tabs that when engaged keep the boxes joined together. A machine screw that is inserted into the top hole, penetrating a mating clearance notch, completes the assembly.

It is an object of this invention to provide for a metal knockdown, modularly constructed electrical outlet box that finds usefulness in old construction where the box is inserted longitudinally into a conformably cut rectangular opening that has minimum clearance around the box.

It is another object of this invention to provide for a metal knockdown, modularly constructed electrical outlet box that provides availability of a large opening through which an electrical cable can be easily passed.

It is still another object of this invention to provide for a metal knockdown, modularly constructed electrical outlet box that is gangable.

It is yet another object of this invention to provide for a metal knockdown, modularly constructed electrical outlet box that has removable partially pierced rear edge members that enlarge the available rear access opening, thereby permitting the use of a larger rear closure plate.

These objects are achieved by providing an electrical outlet box for use in existing buildings, wherein the building walls provide only limited access to electrical power cables in a stud space of the walls. The box is insertable longitudinally into a conformably cut wallboard cavity which has a minimum clearance in the space.

The electrical outlet box of the invention enables cable work outside and remote from the confined space when securing a strain cable relief connector. A removable box component is removed to accomplish the work with reinstallation thereof in the box when the strain cable relief connector is stablized on the removable component, which facilitates the work while preventing destruction to the wallboard surrounding the cavity.

The electrical outlet box has a U-shaped frame with top, rear and bottom sections, identical left and right sidewall plates, each having interlocking tabs that project at essentially right angles from the plates for securing each sidewall plate to the frame. A box rear section is formed by elongate side members interconnecting said top and bottom sections and defining a rear opening comprising an enlarged cable port through which electrical power cables can be drawn.

Each side member is preferably scored to facilitate removal of a side member by a twisting motion. There is further provided an at least one hole through each side member to receive an at least one threaded fastener, and the removable box component is preferably a repositioning backplate that is removably secured to the rear section to provide an enlarged cable port through which the cable can be passed upon temporary removal of the backplate.

An at least one fastener hole is provided in the backplate corresponding to the at least one fastener hole of each side member to receive the at least one threaded fastener for re-securing the backplate to said rear section. Cable can thus be attached to the backplate and further electrical work completed remote from the box; and, the backplate can then be remounted over the cable port and reinstalled in the box upon completion of the work. It is preferred that the at least one fastener be rotatably coupled to the backplate, for reduction in components for assembly.

The backplate may further include at least one knockout portion adapted for removal by a minimal pressure, each said at least one knockout portion dimensioned to receive a strain relief cable and an associated clamp thereof and to serve as additional cable entry ports for the box.

The U-shaped frame having top, rear and bottom sections, is preferably constructed as a single contiguous piece, comprising a U-shaped stamped metal form. The sidewalls are identical and interchangeable for reduction in components required for the box.

The frame top section and bottom section each have first and second projecting tabs, and the sidewall tabs comprise first and second tabs corresponding respectively to said first and second frame section tabs for interlocking engagment to secure each sidewall to the U-shaped frame. Meanwhile, the box rear section is formed with a pair of elongate breakaway side members positioned along a periphery of the rear opening for interconnecting the top and bottom sections.

The objects of the invention are further carried out by providing improvements for a wall supported electrical cable outlet box of a type having wall means with front edges bounding a front opening into a compartment bounded by said wall means. The compartment serves as a closure for electrically connected ends of said cable. The improvements are embodied by the electrical cable outlet box in a U-shape construction having front edges bounding an opening providing the compartment front opening and top, bottom, rear and opposite sides and providing the wall means that bound the compartment. The U-shape construction is operatively disposed in a clearance position forwardly of the slightly oversized rectangular opening in a supporting wall adapted to receive in projected relation therein said U-shape construction.

The U-shape construction has selected plural openings therein for receiving in projected relation therethrough and into said compartment ends of said cable extending through said supporting wall opening, the cable ends which are adapted to be electrically connected to selected cooperating electrical means in a working clearance adjacent said clearance position of said U-shape construction, and stop means connected in depending and ascending relation from top and bottom edges of said compartment front opening.

The electrically connected ends of said cable are adapted to be inserted into said compartment of said U-shape construction, which U-shape construction is then urged in sliding movement from said clearance position through said wall opening until established abutment of said stop means with said supporting wall. These and other advantages of the present invention will become more apparent to those skilled in the art upon reading the following detailed description when applied in conjunction with the drawings where it is shown and described illustratively the preferred embodiment of the invention.

BRIEF DESCRIPTION OF THE DRAWINGS

The invention is diagrammatically illustrated in the following drawings attached herein.

FIG. 1 is front elevational view of the knockdown gangable electrical outlet box showing the available rear access opening. The rear closing member is not shown in this view.

FIG. 2 is a top elevational view of the knockdown gangable electrical outlet box showing the rear member installed.

FIG. 3 is a side elevational view of the knockdown gangable electrical outlet box showing the rear member installed.

DESCRIPTION OF THE PREFERRED EMBODIMENTS

Figure 4:
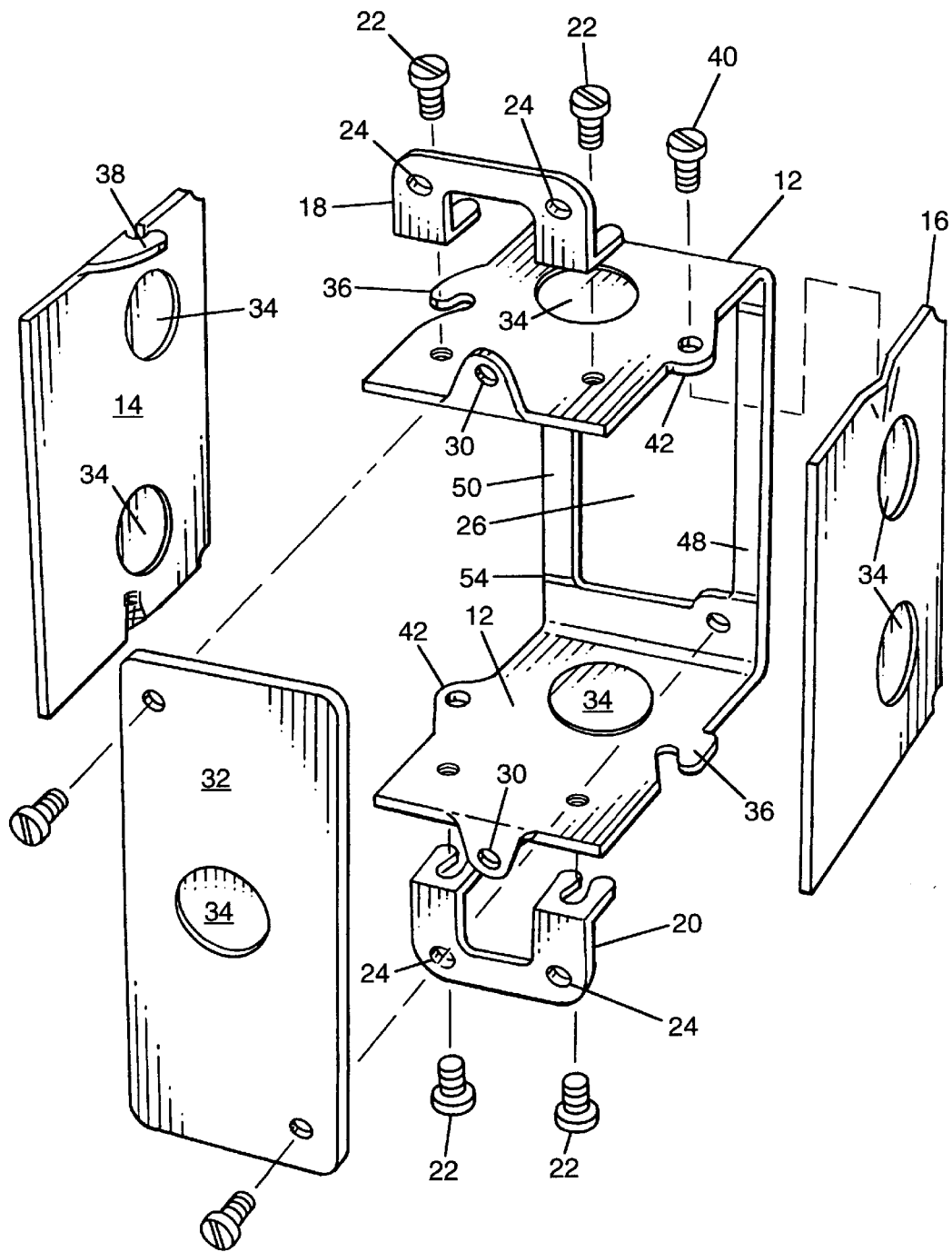
FIG. 4 is an exploded perspective view of the knockdown gangable electrical outlet box showing the rear member installed.

Referring first to FIG. 1 of the drawings, the knockdown electrical outlet box 10 is comprised of a U-shaped member 12, a left sidewall member 14, and a right sidewall member 16. The left sidewall member 14 is identical in all detail to the right sidewall member 16, except for the fact that the right side plate 16 is inverted in the vertical plane from the left sidewall plate 14. Attached to the U-shaped stamping 12 are two installation brackets 18 and 20. The upper bracket 18 and the lower bracket 20 are used to secure the wall box 10 when being installed. Machine screws 22 attach the upper and lower brackets, 18 and 20, securely to the U-shaped metal stamping 12. Installation brackets 18 and 20 are identical and interchangeable with each other. Interchangeability of the installation brackets and the sidewall plates, reduces the number of different parts to manufacture and inventory, thereby reducing the production costs. Holes 24 are provided to receive mounting screws to attach the wall box to the wallboard should the installer choose to do so.

Rear opening 26 provides a removable component for access to the area behind the electrical outlet box through which the electrical power cables can be drawn. Tapped holes 30 are used to mount electrical devices, such as electrical outlets or switches. Two tapped holes 28 are designed to receive two 6-32 machine screws to secure the rear mounted plate 32 as shown in FIG. 2.

FIG. 2 is the top elevation of metal wall box 10. Knockouts 34 in both the top and bottom surfaces of the electrical outlet box provide a means of mounting cable connectors with their associated clamps to secure the electrical power cables should these cable entrance ports be used by the installer. As such, repositioning backplate 32 allows cable attachment to the backplate 32, remote from the confined stud space accessable only through the wallboard cavity, whereupon the backplate can be resecured to the rear section.

Interlocking tabs 36 and 38 secure the sidewall plate 14 to the U-shaped stamping 12. Interlocking tab 36 projects from U-shaped bracket 12 to engage interlocking tab 38 that projects at right angles from sidewall plate 14. Because of identical construction of sidewall plates 14 and 16 to allow for interchangeability, the same means of securement is used in sidewall 16. The final means of securing the sidewall plates to the main U-shaped stamping is with machine screw 40. Machine screw 40 is inserted in the clearance hole in tab 42 with protrudes from U-shaped stamping 10.

FIG. 3 details the side elevation of the knockdown electrical outlet box. Additional knockouts are shown in sidewall plates 14 and 16.

Turning now to FIG. 4, is an exploded perspective view of a single knocked down electrical outlet box. The repositionable backplate 32 is shown in position, ready to be installed in the rear of the wall box assembly 10. Reinstallation of the backplate over rear access 26 is facilitated by the fact that side members 48 and 50, are essentially parallel to one another and perpendicular to the top and bottom portions of the U-shaped stamping.

In typical use, the newly designed and improved electrical outlet box 10 provides the electrical installer with an easier task when used in existing homes, buildings and offices. The installer first cuts a rectangular hole just slightly larger than the outside dimensions of the electrical outlet box. The newly cut hole need only be large enough to fit conformably about the wall box. Next, the electrical installer routes the electrical power cable inside of the existing wall toward the rectangularly cut opening in the wallboard. The power cable is then drawn through the newly cut hole.

Electrical outlet box 10 now is inserted into the rectangular opening, while drawing the power cable through the rear access opening 26. The electrician can secure the electrical outlet box with wallboard screws through clearance holes 24 or secure it by any other method he chooses. A cable strain relief connector with clamp can be installed by removing the knockout 34 found in the rear repositionable plate 32. When positioned and assembled into the rear of the electrical outlet box, it acts as the primary cable entry port. Two machine screws secure the plate to the rear of the wall box. The remainder of the installation can then be completed with the connection of the power cable wires to the electrical device and securing the device.

Figure 5:
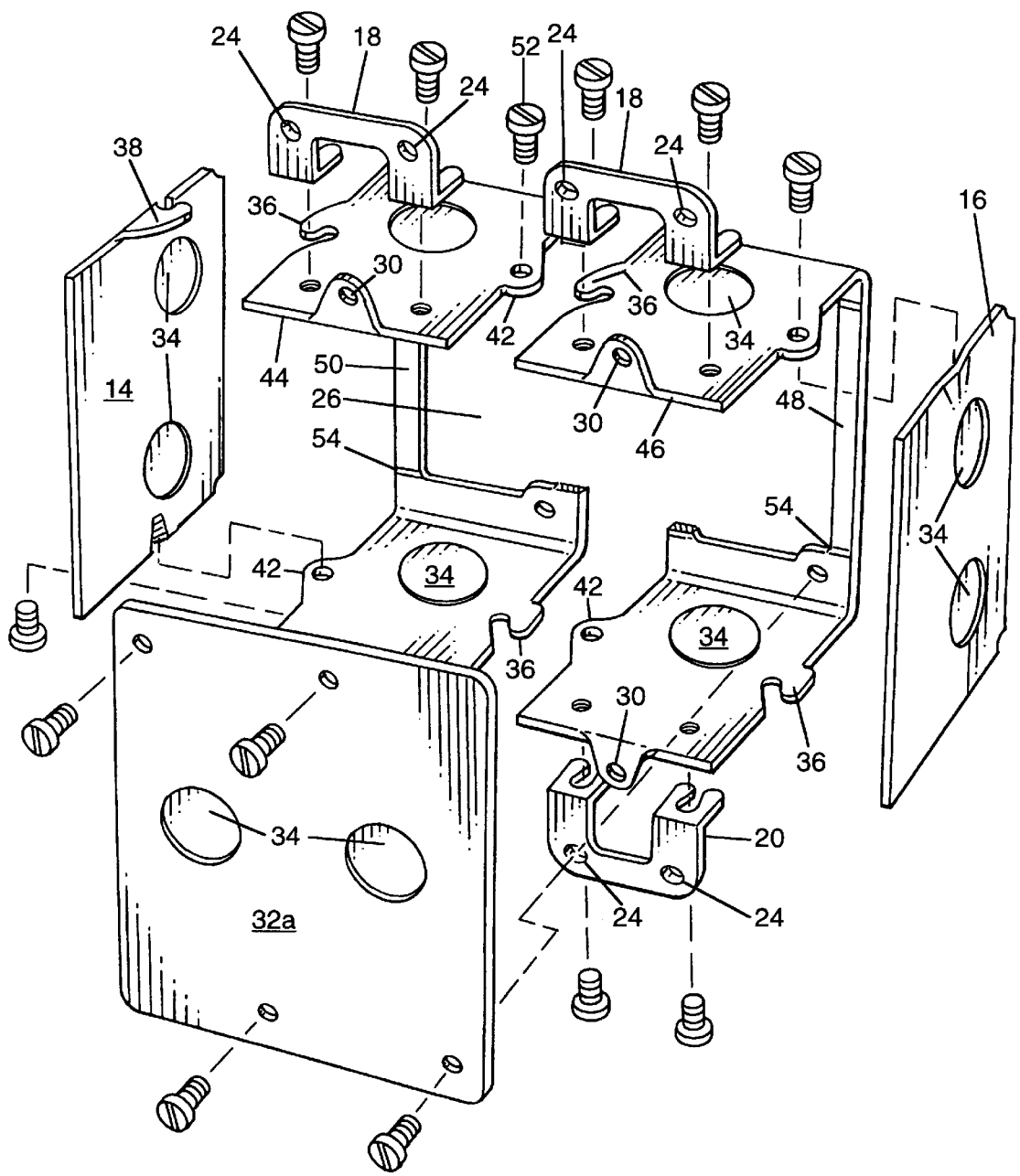
FIG. 5 is an exploded perspective view of the knockdown gangable electrical outlet box showing a double gang box with its associated rear member installed.

FIG. 5 illustrates the detailed assembly of a double gang box made from two U-shaped frames. To join the two U-shaped frames, the right sidewall member is removed from the left-hand side of the electrical outlet box 44 and the left sidewall member is removed from the right-hand side of the electrical outlet box 46.

Next, the breakaway side members 48 and 50 are removed from each U-shaped frame to allow for greater access into the cavity behind the assembled double gang box. Breakaway side member 48 is removed from left-hand side box 44 and breakaway side member 50 is removed from right-hand side box 46. A slight twisting motion with a pair of pliers is all that is needed to remove the a side edge member that has been scored and/or partially machine pierced at 54.

The two boxes 44 and 46 can now be ganged together. Machine screw 52 is turned into the threaded found in tab 42, until it engages the notched portion found in front of tab 36. The lower engagement is made in the same manner. The repositionable backplate 32a, closes the rear access, thereby completing the assembly.

It should be obvious to those skilled in the art that other substitutions in materials or alterations in dimensions can be made without departing from the spirit of the invention.

What is claimed is:

1. An electrical outlet box for use in existing buildings, wherein the building walls provide only limited access to electrical power cables in a stud space of the walls, where the box is inserted longitudinally into a conformably cut wallboard cavity with minimum clearance in the space, the electrical outlet box enabling work with said cables outside the space by securing a strain cable relief connector to a removable box component and reinstallation thereof in the box while preventing destruction to the wallboard surrounding the cavity, said electrical outlet box comprising a U-shaped frame with top, rear and bottom sections, identical left and right sidewall plates, each having interlocking tabs that project at essentially right angles from the plates for securing each sidewall plate to the frame, the rear section formed by a pair of elongate side members interconnecting said top and bottom sections and defining a rear opening through which electrical power cables can be drawn, each side member pair scored to facilitate removal of a side member by a twisting motion, an at least one hole through each side member to receive an at least one threaded fastener, and a repositioning backplate removably secured to the rear section to provide an enlarged cable port through which the cable can be passed upon temporary removal thereof, and an at least one fastener hole in the backplate corresponding to the at least one fastener hole of each side member to receive the at least one threaded fastener for re-securing the backplate to said rear section, whereby cable can be attached to the backplate and further electrical work completed remote from the box and the backplate remounted over the cable port and reinstalled in the box upon completion of the work.

2. The outlet box of claim 1, wherein the at least one fastener is rotatably coupled to the backplate, for reduction in components for assembly.

3. The outlet box of claim 2, the backplate further comprising an at least one knockout portion adapted for removal by a minimal pressure, each said at least one knockout portion dimensioned to receive a strain relief cable and an associated clamp thereof and to serve as additional cable entry ports for the box.

4. The outlet box of claim 3, wherein the u-shaped frame with top, rear and bottom sections, is a single contiguous piece, comprising a U-shaped stamped metal form.

5. The outlet box of claim 4, wherein the identical sidewalls are interchangeable for reduction in components required for the box.

6. The outlet box of claim 5, wherein the frame top section and bottom section each have first and second projecting tabs, and the sidewall tabs comprise first and second tabs corresponding respectively to said first and second frame section tabs for interlocking engagment to secure each sidewall to the U-shaped frame.

7. The outlet box of claim 6, wherein each of the elongate breakaway side members is essentially parallel to the other.

8. The outlet box of claim 7, wherein each of the side members is essentially orthogonal to the top and the bottom sections.

9. The outlet box of claim 8, each of the pair of breakaway side members having a plurality of partially machine pierced areas to facilitate removal of a side member by a slight twisting motion with a pair of pliers.

10. The outlet box of claim 9, the top and bottom sections each having an at least one knockout portion adapted for removal by a minimal pressure, each said at least one knockout portion dimensioned to receive a cable connector and its associated clamp for securing an electrical power cable.

11. The outlet box of claim 10, the sidewalls each having an at least one knockout portion adapted for removal by a minimal pressure, each said at least one knockout portion dimensioned to receive a cable connector and its associated clamp for securing an electrical power cable.

12. The outlet box of claim 11, further comprising an upper installation bracket connected to the top section and having a pair of mounting holes therethrough to receive a pair of mounting screws, and a lower installation bracket connected to the bottom section and having a pair of mounting holes therethrough to receive a pair of mountuing screws, for mounting a wall box in a wallboard cavity and to prevent the box from being pushed into the wallboard cavity.

\* \* \* \* \*